United States Patent
Friedrich et al.

(10) Patent No.: US 11,685,346 B2
(45) Date of Patent: Jun. 27, 2023

(54) HYDRAULIC BRAKING SYSTEM FOR A VEHICLE HAVING AT LEAST TWO AXLES

(71) Applicant: Robert Bosch GmbH, Stuttgart (DE)

(72) Inventors: Thomas Friedrich, Ingersheim (DE); Dirk Drotleff, Oberstenfeld-Gronau (DE); Ralf Kleemann, Benningen Am Neckar (DE); Daniel Brenndoerfer, Ludwigsburg (DE); Bernd Hienz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 17/255,334

(22) PCT Filed: May 24, 2019

(86) PCT No.: PCT/EP2019/063478
§ 371 (c)(1),
(2) Date: Dec. 22, 2020

(87) PCT Pub. No.: WO2020/001878
PCT Pub. Date: Jan. 2, 2020

(65) Prior Publication Data
US 2021/0268997 A1 Sep. 2, 2021

(30) Foreign Application Priority Data
Jun. 28, 2018 (DE) ...................... 10 2018 210 538.3

(51) Int. Cl.
*B60T 7/12* (2006.01)
*B60T 13/14* (2006.01)
(Continued)

(52) U.S. Cl.
CPC ................ *B60T 7/12* (2013.01); *B60T 13/14* (2013.01); *B60T 13/16* (2013.01); *B60T 13/686* (2013.01);
(Continued)

(58) Field of Classification Search
CPC .......... B60T 7/12; B60T 17/221; B60T 13/16; B60T 2270/406; B60T 13/14; B60T 2270/402; B60T 2270/413; B60T 13/686
See application file for complete search history.

(56) References Cited

U.S. PATENT DOCUMENTS 9,776,607 B2  10/2017  Brenn et al.
11,148,651 B2 * 10/2021  Hienz ....................... B60T 7/12
(Continued)

FOREIGN PATENT DOCUMENTS

CN  105764759 A  7/2016
DE  199 26 495 A1  12/2000
(Continued)

OTHER PUBLICATIONS

International Search Report corresponding to PCT Application No. PCT/EP2019/063478, dated Jul. 23, 2019 German and English language document) (6 pages).

*Primary Examiner* — Pamela Rodriguez
(74) *Attorney, Agent, or Firm* — Maginot, Moore & Beck LLP (57) ABSTRACT

The disclosure relates to a hydraulic brake system for a highly automated or autonomous vehicle which includes three pressure generators which provide sufficient braking force even in a case of a fault. Two of the pressure generators are assigned in a redundant manner to one axle and a modulation unit is configured to hydraulically connect the two pressure generators to the wheel brakes of the first axle, and to perform individual brake pressure modulation in the wheel brakes. The third pressure generator is hydraulically separate from the other pressure generators, and another modulation unit is configured to hydraulically connect the third pressure generator to wheel brakes of another axle, and to perform individual brake pressure modulation in the wheel brakes.

16 Claims, 5 Drawing Sheets

(51) Int. Cl.
  *B60T 13/16* (2006.01)
  *B60T 13/68* (2006.01)
  *B60T 17/22* (2006.01)

(52) U.S. Cl.
  CPC ....... *B60T 17/221* (2013.01); *B60T 2270/402* (2013.01); *B60T 2270/406* (2013.01); *B60T 2270/413* (2013.01)

(56) References Cited

U.S. PATENT DOCUMENTS

2012/0299367 A1* 11/2012 Ross .................... B60T 8/4872
 303/3
2017/0001612 A1* 1/2017 Bauer .................. B60T 8/4081

FOREIGN PATENT DOCUMENTS

| | | |
|---|---|---|
| DE | 10 2012 010 562 A1 | 11/2013 |
| DE | 10 2013 224 776 A1 | 6/2015 |
| DE | 10 2013 224 783 A1 | 6/2015 |
| DE | 10 2016 203 563 A1 | 9/2017 |
| GB | 2 212 574 A | 7/1989 |
| WO | 00/74987 A1 | 12/2000 |

* cited by examiner

HYDRAULIC BRAKING SYSTEM FOR A VEHICLE HAVING AT LEAST TWO AXLES

This application is a 35 U.S.C. § 371 National Stage Application of PCT/EP2019/063478, filed on May 24, 2019, which claims the benefit of priority to Serial No. DE 10 2018 210 538.3, filed on Jun. 28, 2018 in Germany, the disclosures of which are incorporated herein by reference in their entirety.

The disclosure is based on a hydraulic brake system for a vehicle having at least two axles, in particular for a highly automated or autonomous vehicle.

The prior art has disclosed vehicles having at least one highly automated or autonomous driving function, which functions can at least partially perform an actual driving task. As a result, the vehicles can drive in a highly automated or autonomous fashion by virtue of the fact that the vehicles independently detect the course of the road, other road users or obstacles, for example, and calculate the corresponding actuation commands in the vehicle and pass them on to the actuators in the vehicle, as a result of which the driving profile of the vehicle is correctly influenced. In such a highly automated or autonomous vehicle, the driver is generally not involved in the events on the road. Nevertheless, measures and means are provided which make it possible for the driver to be able to intervene himself in the events on the road at any time.

In addition, brake systems for vehicles which are configured for actuation by a vehicle driver with a hydraulic intervention are known in the prior art. As a result, when the brake system fails it is ensured that the driver can still apply sufficient braking force to the wheels of the vehicle by activating the brake pedal. This configuration decisively influences the topology of contemporary brake systems. It is therefore possible, for example, for the size of a tandem master brake cylinder to be tailored to maintaining a good performance in the fallback level. In addition, the brake systems can be embodied as what are referred to as coupled brake systems or power-assisted brake systems. However, these systems are also implemented in such a way that a hydraulic intervention by the driver is still provided as a fallback level as in the past. Power-assisted braking equipment is unsuitable for highly autonomous or autonomous vehicles since in such cases there is no longer a driver to be assisted during an autonomous driving function and the brake system has to build up the braking power completely independently.

U.S. Pat. No. 9,776,607 B2 discloses a fault-tolerant redundant brake system for a motor vehicle. The brake system comprises a first brake set and the second brake set. A first hydraulic brake circuit is connected to the first brake set, and a second hydraulic brake circuit is connected to the second brake set. In addition, a first control module is coupled to the first hydraulic brake circuit and to the second hydraulic brake circuit. The first control module is configured to control the fluid pressure both within the first hydraulic brake circuit and within the second hydraulic brake circuit. A second control module is also coupled to the first hydraulic brake circuit and to the second hydraulic brake circuit. The second control module is configured to control a fluid pressure both within the first hydraulic brake circuit and within the second hydraulic brake circuit independently of the first control module. The first control module is arranged in series with the second control module in the first and second hydraulic brake circuits. In addition, a virtual driver sends a deceleration request to the first control module and to the second control module. The first control module and the second control module determine a desired pressure on the basis of the deceleration request. The first brake control module controls the fluid pressure within both the first and second hydraulic brake circuits, in order to carry out the deceleration request. The second control module monitors the pressure downstream of the first control module and compares the monitored pressure with the desired pressure.

SUMMARY

The hydraulic brake system for a vehicle having at least two axles, in particular for a highly automated or autonomous vehicle as disclosed herein has the advantage that a simple, robust and cost-effective brake circuit architecture without mechanical and/or hydraulic intervention via the driver is made available, which architecture makes possible sufficient braking performance even in the case of a fault, by virtue of three pressure generators and a suitable redundancy concept.

Furthermore, embodiments of the hydraulic brake system for a vehicle make possible a facilitated mounting concept with pre-mounting of the two sub-brake systems on the corresponding vehicle axles. Of the three pressure generators, two are implemented in a redundant sub-brake system in a series connection on a first axle, preferably on a front axle. The third pressure generator is implemented in a further sub-brake system on a second axle, preferably on a rear axle. There is no hydraulic connection between the sub-brake systems on the various axles. For example, plunger systems, pump systems or pump systems with pressure accumulators can be used as pressure generators or volume generators.

Electrohydraulic actuators, in which an electrically conductive fluid is set in motion by applying current and a magnetic field, are also conceivable. In this context, the pressure generators are each actuated by a separate control apparatus, wherein the pressure generators of the first sub-brake system are connected to different on-board power systems. The third pressure generator of the second sub-brake system is connected to a further on-board power system or to one of the on-board power systems to which one of the pressure generators of the first sub-brake system is connected. The brake system is configured as a pure brake-by-wire system, this means that a mechanical and/or hydraulic intervention by the driver is not possible, and both autonomous braking requests and requests by the driver are communicated in a purely electrical fashion to the brake system via a data bus. The dual-circuit character of the overall brake system is provided by the proposed architecture with separate sub-brake systems on different axles.

Embodiments of the present disclosure make available a hydraulic brake system for a vehicle having at least two axles, in particular for a highly automated or autonomous vehicle, having at least two sub-brake systems which are hydraulically separate from one another. In this context, a first sub-brake system comprises a first brake circuit, a main system which has a first power supply and a first evaluation and control unit, and a secondary system which has the second power supply which is independent of the first power supply, and a second evaluation and control unit, for redundantly generating pressure in the first brake circuit. The first sub-brake system is assigned to a first axle having at least two wheel brakes. The first brake circuit comprises a first pressure generator which is assigned to the main system, a second pressure generator which is assigned to the secondary system, which pressure generators are connected hydraulically in series between a first fluid container and the at least two wheel brakes of the first axle, and a modulation unit for hydraulically connecting the pressure generators to the at least two wheel brakes and for performing individual brake pressure modulation in the at least two wheel brakes. A second sub-brake system comprises a second brake circuit and a subsidiary system which has a third power supply and a third evaluation and control unit, for generating pressure in the second brake circuit. The second sub-brake system is assigned to a second axle having at least two wheel brakes. The second brake circuit comprises a third pressure generator which is assigned to the subsidiary system and is arranged between a second fluid container and the at least two wheel brakes of the second axle, and a modulation unit for hydraulically connecting the pressure generator to the at least two wheel brakes and for performing the individual brake pressure modulation in the at least two wheel brakes.

By virtue of the individual brake pressure modulation in the individual wheel brakes, different closed-loop control functions, such as for example an anti-lock brake system ABS, a traction control system ASR, a vehicle movement dynamics control system FDR or ESP can be used for providing longitudinal and transverse stabilization of the vehicle. Since these control functions are known per se, more details are not given on them here.

Embodiments of the brake system make possible and/or support new fabrication concepts for vehicle manufacturers. Since no hydraulic lines run between the axles through the vehicle, the hydraulically separate sub-brake systems already make it possible to mount a brake system on the corresponding axle module. Therefore, the mounting of the brake system and the putting into operation of the brake system no longer take place on the particularly time-critical main line but instead can be laid on a subsidiary "subassembly" line. Alternatively, a complete axle module with a filled brake system can also be supplied to the fabrication line of the vehicle manufacturer and then only has to be integrated mechanically into the vehicle and electrically connected. In addition, installation and/or packaging advantages are obtained since the sub-brake systems are smaller and/or lighter in weight than a central brake system and can therefore be integrated more easily into the given installation space. By eliminating brake lines from the front to the rear, installation space is also freed up and in the case of electric battery vehicles with a battery pack (battery packs), the mounting of the battery pack is made easier. Furthermore, in this way in addition to the specified fabrication advantages easier changing of the battery is also possible either when servicing or as a replacement battery (exchanging the battery instead of charging). Furthermore, the time for hydraulically filling the brake system is also optimized through reduced line lengths, a smaller circuit volume per sub-brake system and separate filling of the two sub-brake systems away from the main fabrication line of the vehicle. Furthermore, the risk of damaging hydraulic lines in the underfloor or between the front axle and the rear axle during fabrication, in the driving mode or in servicing is reduced so that failure probabilities can also be slightly reduced.

As a result of the threefold pressure generator redundancy, longer autonomous continuous travel ("complete the mission") can also be made possible after an initial fault which leads to the loss of a pressure generator or of a sub-brake system, since redundancy is still present.

Embodiments of the disclosure have fewer components than known brake systems since fewer valves, shorter brake lines, no pedal travel simulator and no mechanism are necessary to generate the driver pressure or boost it and transmit it onward so that lower brake system costs are incurred. In addition, the system costs become lower since only one hydraulic connection is present at the wheel brakes and there is no need for any alternative solutions with two connections in the brake caliper which act on different pistons. Furthermore, the fluid containers have just one hydraulic connection per brake circuit, and alternative solutions with a plurality of connections are superfluous.

Furthermore, lower integration costs are incurred at the vehicle manufacturer since owing to the electrical actuation without a mechanical and/or hydraulic intervention via the driver the embodiments of the disclosure permit a simple design, in particular for righthand drive and lefthand drive vehicles and free up installation space at the bulkhead between the engine compartment and the vehicle passenger compartment. Since none of the brake system actuators has to be mounted on the bulkhead, NVH (Noise, Vibration, Harshness) advantages are also obtained. Owing to the smaller number of components the weight and the volume also become lower in comparison with known brake systems.

The evaluation and control unit can be understood here to be an electrical apparatus such as for example a control apparatus which processes or evaluates acquired sensor signals. The evaluation and control unit can have at least one interface which can be embodied by means of hardware and/or software. In the case of a hardware embodiment, the interfaces can be, for example, part of what is referred to as an ASIC system, which includes a wide variety of functions of the evaluation and control unit. However, it is also possible for the interfaces to be separate integrated circuits or to be composed at least partially of discrete components. In the case of a software embodiment, the interfaces can be software modules which are present, for example, on a microcontroller together with other software modules. A computer program product with program code which is stored in a machine-readable carrier such as a semiconductor memory, a hard disk memory or an optical memory and is used to carry out the evaluation when the program is run by the evaluation and control unit is also advantageous.

For the acquisition of the sensor signals, sensor units are provided which are understood here to be assemblies which comprise at least one sensor element which directly or indirectly senses a physical variable or a change in a physical variable and preferably converts it into an electrical sensor signal. This can take place, for example, by emitting and/or receiving soundwaves and/or electromagnetic waves and/or by means of a magnetic field or the change in a magnetic field and/or by receiving satellite signals, for example of a GPS signal. Such a sensor unit can comprise, for example, acceleration sensor elements which sense acceleration-relevant information of the vehicle, and/or sensor elements which detect objects and/or obstacles and/or other vehicle surroundings data which is relevant to a crash and make it available for evaluation. Such sensor elements can be based, for example, on video technologies and/or radar technologies and/or lidar technologies and/or PMD technologies and/or ultrasound technologies. In addition, it is also possible to evaluate signals and information on an existing ABS sensor system and the variables which are derived in the control apparatus which is provided for it. On the basis of the acceleration-relevant information and/or variables determined therefrom it is possible for example to estimate a vehicle movement and a vehicle position in three-dimensional space and evaluate them for the purpose of accident detection.

In order to determine the position of the vehicle, it is possible to use, for example, global navigation satellite systems GNSS (Global Navigation Satellite System). In this context, GNSS is used as a generic term for the use of existing and future global satellite systems such as NAVSTAR GPS (Global Positioning System) of the United States of America, GLONASS (Global Navigation Satellite System) of the Russian Federation, Galileo of the European Union and Beidou of the People's Republic of China, etc.

A highly automated or autonomous vehicle is understood to be a vehicle which has at least one highly automated or autonomous driving function which can at least partly perform an actual driving task. By means of this at least one highly automated or autonomous driving function, the vehicle detects, for example, the course of the road, other road users or obstacles automatically and calculates the corresponding actuation commands which are passed on to the actuators in the vehicle, as a result of which the driving profile of the vehicle is correctly influenced. In such a highly automated or autonomous vehicle, the driver is generally not involved in the events on the road. Nevertheless, measures and means are provided, for example in the form of electrical or electronic activation elements, which make it possible for the driver to be able to be intervene himself in the events on the road at any time. The driver's braking request which is generated by means of the activation elements is then passed on to the main system and/or the secondary system by means of electrical signals. A mechanical and/or hydraulic intervention by the driver is, however, not present.

The at least one driving function evaluates, for the purpose of trajectory planning, vehicle data acquired from internal sensor units such as ABS interventions, steering angle, position, direction, speed, acceleration etc. and/or vehicle surroundings data which are acquired, for example, by means of camera sensor units, radar sensor units, lidar sensor units and/or ultrasound sensor units, and said driving function correspondingly actuates the evaluation and control units of the main system and of the secondary system in order to generate a desired brake pressure and/or in order to implement stabilization processes in the longitudinal direction and/or transverse direction by means of individual brake pressure modulation in the wheel brakes.

Advantageous improvements of the hydraulic brake system, specified herein, for a vehicle having at least two axles, in particular for a highly automated or autonomous vehicle, are possible by virtue of the measures and developments disclosed herein.

It is particularly advantageous that the first modulation unit and/or the second modulation unit can respectively comprise an inlet valve and respectively an outlet valve for each of the assigned wheel brakes for performing individual brake pressure modulation.

In one advantageous refinement of the brake system, the first sub-brake system and/or the second sub-brake system can be embodied as hydraulically open systems, wherein a first pressure discharge path in the first sub-brake system can connect the outlet valves of the assigned wheel brakes of the first axle to the first fluid container. A second pressure discharge path in the second sub-brake system can connect the outlet valves of the assigned wheel brakes of the second axle to the second fluid container. A hydraulically open brake system is understood to be a brake system in which brake fluid which is discharged during an individual brake pressure modulation process can be fed back to a corresponding fluid container from the wheel brakes via a corresponding pressure discharge path. The open system is additionally defined by the fact that during wheel-specific pressure modulation or pressure reduction brake fluid volumes can be discharged from the pressure circuit via the outlet valves directly back into the corresponding fluid accumulator at atmospheric pressure. This has the advantage in a system which is decoupled from the driver that the low pressure accumulator and switching valve components for the pump intake path are not required and furthermore also a pressure reduction of any desired magnitude can be brought about since a storage chamber can never become full.

In a further advantageous refinement of the brake system, firstly the first pressure generator and then the second pressure generator can be arranged downstream of the first fluid container in the first brake circuit. Alternatively, firstly the second pressure generator and then the first pressure generator can be arranged downstream of the first fluid container in the first brake circuit. This means that the sequence of the pressure generators which are connected fluidically in series can be adapted to the installation conditions without negative effects on the functionality.

In a further advantageous refinement of the brake system, the pressure generators can each be embodied as a plunger system or as a pump system or as a pump system with a pressure accumulator or as electrohydraulic actuators. It is therefore possible, for example in a particularly advantageous embodiment of the brake system, for the first pressure generator of the main system to be embodied as a first plunger system, and the second pressure generator as a second plunger system or as a pump system, and the third pressure generator of the subsidiary system as a third plunger system. The embodiment of the first pressure generator and of the third pressure generator as plunger systems gives rise to a good NVH performance in the overall system and easier and/or more accurate monitoring and improved control. This permits both the position and the volume information and pressure increase information in the main system and in the subsidiary system to be acquired more easily and, in particular, more accurately in comparison with other concepts (pump system). By virtue of the embodiment of the second pressure generator as a plunger system, a very good NVH performance is obtained both in the normal operating mode and in the event of the failure of the main system. By virtue of the embodiment of the second pressure generator as a pump system, even lower costs, installation space and weight are obtained in comparison with other concepts (plunger system). As an alternative in the first sub-brake system a pump system be used as a first pressure generator. As a further alternative, the first sub-brake system can be embodied as a closed system which uses a pump system as a second pressure generator.

In a further advantageous refinement of the brake system, the first brake circuit can have, for the first plunger system, a shutoff valve which permits recharging of brake fluid from the first fluid container. In addition, the second brake circuit can have, for the second plunger system, a shutoff valve which permits recharging of brake fluid from the second fluid container. Owing to the open architecture, the first plunger system is able to recharge or sniff fluid. In this context, the shutoff valves advantageously prevent the plunger systems from sucking brake fluid from the wheel brakes during the recharging process. Furthermore, the first brake circuit can have, for the first plunger system, a suction line with a nonreturn valve, which line can additionally connect the first plunger system hydraulically to the first fluid container. In addition, the second brake circuit can have, for the second plunger system, a suction line with a nonreturn valve, which line can additionally connect the third plunger system hydraulically to the second fluid container. As a result, the recharging process of the plunger systems can be carried out more quickly, in particular at low temperatures.

In a further advantageous refinement of the brake system, the first brake circuit can have, for the pump system in the first brake circuit, a pressure maintenance and control valve which is assigned to the secondary system, and can be actuated by the second evaluation and control unit and supplied with power by the second power supply. The inlet valves and the pressure maintenance and control valve can be embodied, for example, as adjustable solenoid valves which are open in the deenergized state. The outlet valves and the shutoff valves can be embodied, for example, as electromagnetic switching valves which are closed in the deenergized state. By means of this embodiment of the brake circuits it is advantageously possible to use components from already known ESP systems and to achieve very low overall system costs by means of already existing scale effects (millions of ESP systems are constructed).

In a further advantageous refinement of the brake system, the first brake circuit can have, for the pump system, a suction line with a nonreturn valve which can additionally connect the pump system hydraulically to the first fluid container. Hot redundancy can be implemented specifically for a variant in which the pressure generator which is embodied as a pump system is arranged underneath the first pressure generator which is embodied as a plunger system. In this context, the pump system can assist the plunger system so that the main system can be given smaller and more cost-effective dimensions in respect of a maximum pressure to be reached and therefore in respect of a maximum drive motor torque. In addition, the additional suction path for the pump system does not result in any suction problems at low temperatures.

In a further advantageous refinement of the brake system, the evaluation and control units of the sub-brake systems can communicate with one another via a bus system. In this context, the first and second evaluation and control unit of the first sub-brake system can be implemented as a master, and the third evaluation and control unit of the second sub-brake system can be implemented as a slave. This means that vehicle functions, such as for example a vehicle controller are calculated and adjusted to the first and second evaluation control unit of the first sub-brake system, and actuation requests are transmitted from the first sub-brake system to the third evaluation and control unit of the second sub-brake system.

In a further advantageous refinement of the brake system, components of the first modulation unit for performing individual brake pressure modulation can be assigned to the main system so that these components of the first modulation unit and the first pressure generator are actuated by the first evaluation and control unit and supplied with power by the first power supply. Analogously, components of the second modulation unit for performing individual brake pressure modulation can be assigned to the subsidiary system so that these components of the second modulation unit and the third pressure generator can be actuated by the third evaluation and control unit and supplied with power by the third power supply. In this context, the first power supply of the main system or the second power supply of the secondary system can be used as a third power supply of the subsidiary system. Alternatively, the third power supply can be embodied as a separate power supply which is independent of the first and second power supplies.

Exemplary embodiments of the disclosure are illustrated in the drawing and explained in more detail in the following description. In the drawing, identical reference symbols denote components or elements which carry out the same or analogous functions.

DETAILED DESCRIPTION

Figure 1:
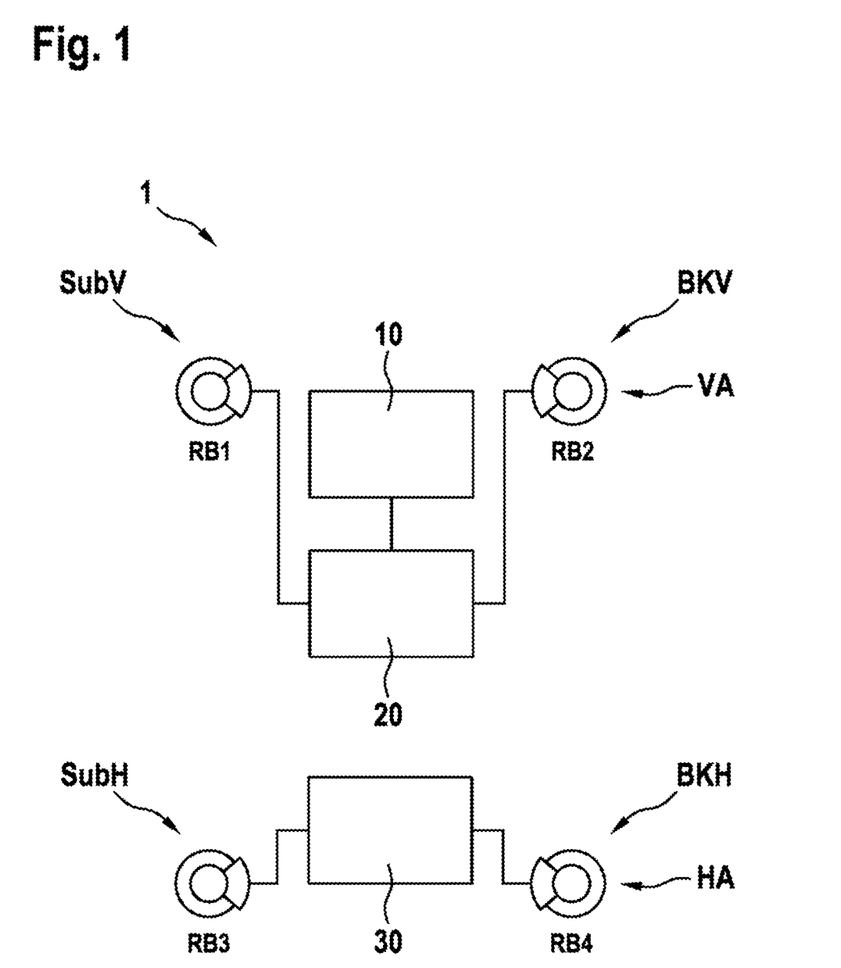
FIG. 1 shows a schematic block diagram of an exemplary embodiment of a hydraulic brake system according to the disclosure for a vehicle having at least two axles, in particular for a highly automated or autonomous vehicle.
Figure 2:
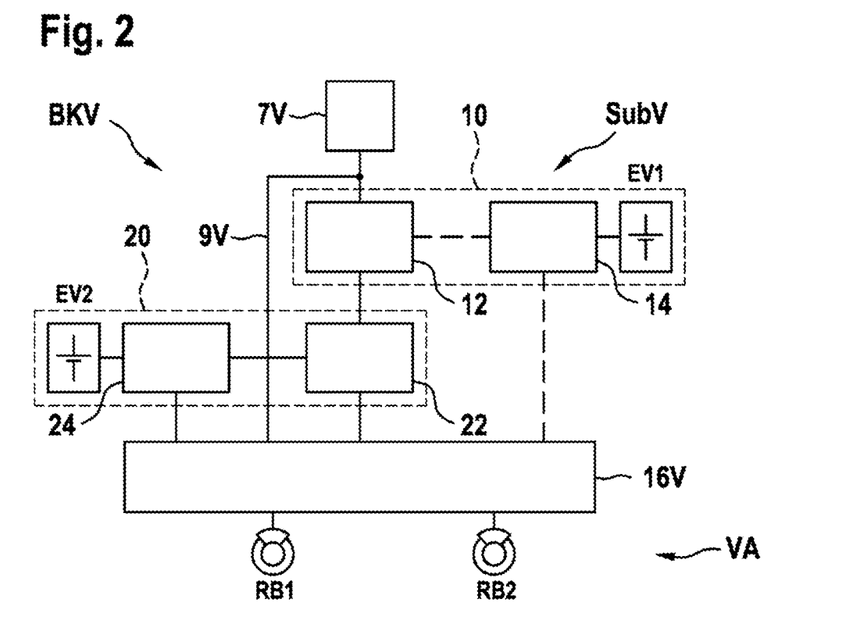
FIG. 2 shows a schematic block diagram of an exemplary embodiment of a first sub-brake system of the brake system according to the disclosure from FIG. 1.
Figure 3:
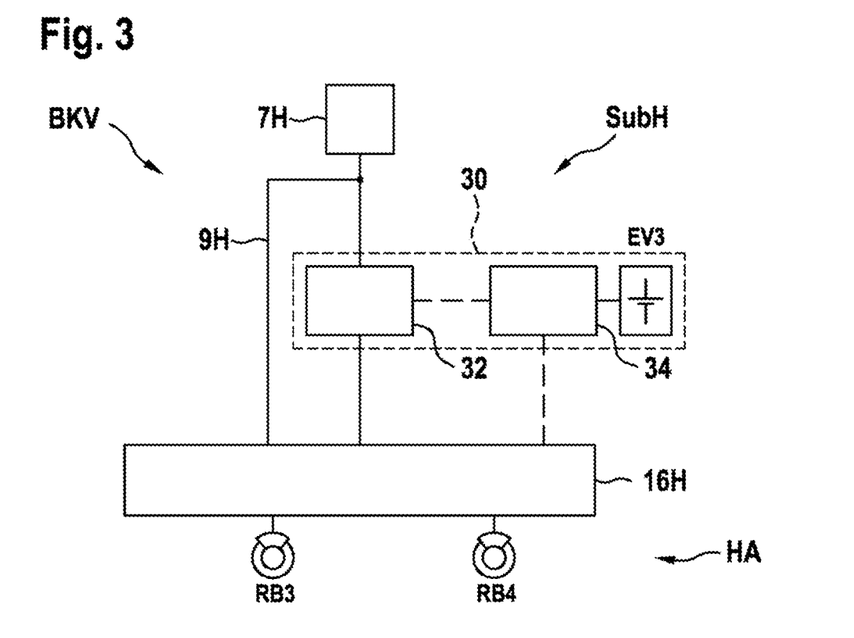
FIG. 3 shows a schematic block diagram of an exemplary embodiment of a second sub-brake system of the brake system according to the disclosure from FIG. 1.

As is apparent from FIGS. 1 to 3, the illustrated exemplary embodiment of a hydraulic brake system 1 according to the disclosure for a vehicle having at least two axles VA, HA, in particular for a highly automated or autonomous vehicle, comprises at least two sub-brake systems SubV, SubH which are hydraulically separate from one another. In this context, a first sub-brake system SubV comprises a first brake circuit BKV, a main system 10 which has a first power supply EV1 and a first evaluation and control unit 14, and a secondary system 20 which has a second power supply EV2 which is independent of the first power supply EV1, and a second evaluation and control unit 24, for redundantly generating pressure in the first brake circuit BKV. The first sub-brake system SubV is assigned to a first axle VA, here a front axle of the vehicle, having at least two wheel brakes RB1, RB2. The first brake circuit BVK comprises a first pressure generator 12 which is assigned to the main system 10, a second pressure generator 22 which is assigned to the secondary system 20 and is connected hydraulically in series between a first fluid container 7V and the at least two wheel brakes RB1, RB2 of the first axle VA, and a first modulation unit 16V for hydraulically connecting the pressure generators 12, 22 to the at least two wheel brakes RB1, RB2 and for performing individual brake pressure modulation in the at least two wheel brakes RB1, RB2. A second sub-brake system SubH comprises a second brake circuit BKH and a subsidiary system 30 which has a third power supply EV3 and a third evaluation and control unit 34, for generating pressure in the second brake circuit BKH. The second sub-brake system SubH is assigned to a second axle HA, here the rear axle of the vehicle, having at least two wheel brakes RB3, RB4. The second brake circuit BKH comprises a third pressure generator 32 which is assigned to the subsidiary system 30 and is arranged between a second fluid container 7H and the at least two wheel brakes RB3, RB4 of the second axle HA, and a second modulation unit 16H for hydraulically connecting the pressure generator 32 to the at least two wheel brakes RB3, RB4 and for performing individual brake pressure modulation in the at least two wheel brakes RB3, RB4.

The evaluation and control units 14, 24, 34 of the two sub-brake systems SubV, SubH communicate with one another via a bus system (not illustrated), wherein the first and second evaluation and control units 14, 24 of the first sub-brake system SubV are implemented as a master, and the third evaluation and control unit 34 of the second sub-brake system SubH is implemented as a slave. In the illustrated exemplary embodiment, the third power supply EV3 is embodied as a separate unit which is independent of the first and second power supplies EV1, EV2. In alternative exemplary embodiments (not illustrated), the first power supply EV1 of the main system 10 or the second power supply EV2 of the secondary system 20 can be used as a third power supply E3 of the subsidiary system 30.

Figure 4:
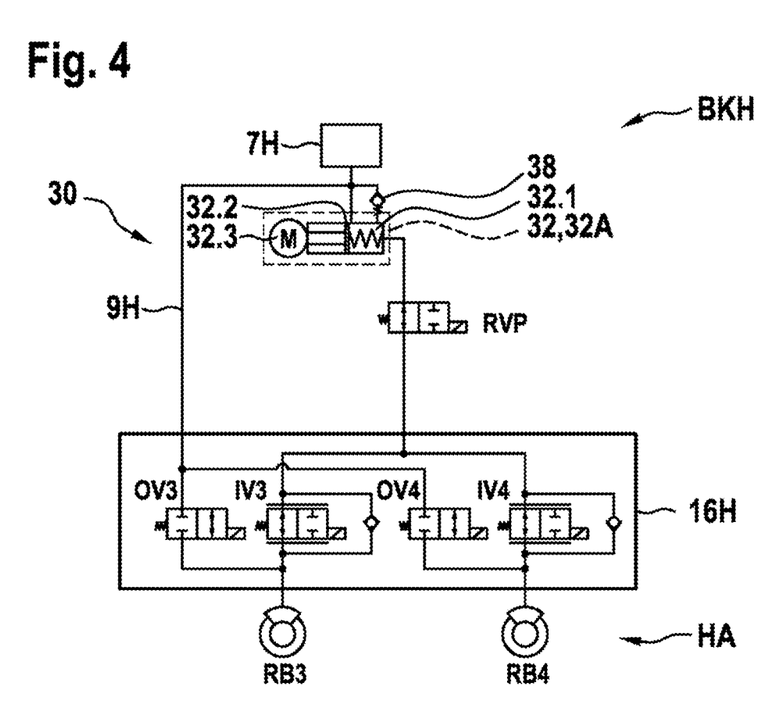
FIG. 4 shows a schematic hydraulic circuit diagram of a second brake circuit of the second sub-brake system from FIG. 3.

As is also apparent from FIG. 4, the third pressure generator 32 of the subsidiary system 30 is embodied as a plunger system 32A in the illustrated exemplary embodiment of the second brake circuit BKH. The plunger system 32A comprises a cylinder-piston unit which comprises a fluid chamber 32.1 and a piston 32.2. In this context, the piston 32.2 is moved by a drive 32.3, embodied here as an electric motor, counter to the force of a restoring spring (not denoted in more detail here), in order to set a desired pressure in the second brake circuit BKH. In the illustrated exemplary embodiment, the fluid chamber 32.1 of the plunger system 32A is open in the deenergized state.

As is also apparent from FIG. 4, the second modulation unit 16H in the illustrated exemplary embodiment of the second brake circuit BKH comprises respectively an inlet valve IV3, IV4 and respectively an outlet valve OV3, OV4 for each of the assigned wheel brakes RB3, RB4 for performing individual brake pressure modulation. As is also apparent from FIGS. 3 and 4, the second sub-brake system SubH is embodied as a hydraulically open system, and a second pressure discharge path 9H in the second sub-brake system SubH connects the outlet valves OV3, OV4 of the assigned wheel brakes RB3, RB4 of the second axle HA to the second fluid container 7H.

As is also apparent from FIG. 4, the second brake circuit BKH for the second plunger system 32A has a shutoff valve RVP which makes it possible to recharge brake fluid from the second fluid container 7H. In order to recharge the fluid chamber 32.1 of the third plunger system 32A, the shutoff valve RVP is opened, so that the plunger system 32A cannot suck any fluid out of the wheel brakes RB3, RB4. In addition, the second brake circuit BKH has, for the third plunger system 32A, in addition to the direct connection to the second fluid container 7H a suction line with a nonreturn valve 38, which line additionally connects the third plunger system 32A hydraulically to the second fluid container 7H. Components of the second modulation unit 16H are assigned, for performing individual brake pressure modulation, to the subsidiary system 30 so that these components of the second modulation unit 16H, the shutoff valve RVP and the third pressure generator 32 are actuated by the third evaluation and control unit 34 and supplied with power by the third power supply EV3.

As is also apparent from FIGS. 2 and 5 to 8, the first pressure generator 12 of the main system 10 is embodied as a first plunger system 12A, and the second pressure generator 22 as a second plunger system 22A or as a pump system 22B. The plunger systems 12A, 22A each comprise a cylinder-piston unit which comprises a fluid chamber 12.1, 22.1 and a piston 12.2, 22.2. In this context, the pistons 12.2, 22.2 are each moved by a drive 12.3, 22.3, embodied here as electric motors, counter to the force of restoring springs (not denoted in more detail here) in order to set a desired pressure in the first brake circuit BKV, BKVA, BKVB, BKVC, BKVD. In the illustrated exemplary embodiment, the fluid chambers 12.2, 22.2 of the plunger systems 12A, 22A are open in the deenergized state. The pump system 22B comprises a pump 22.1 which is driven by a drive 22.3, here an electric motor, in order to set a desired pressure in the first brake circuit BKV, BKVA, BKVB.

As is also apparent from FIGS. 2 and 5 to 8, the first modulation unit 16V in the illustrated exemplary embodiments of the first brake circuit BKV, BKVA, BKVB, BKVC, BKVD comprises respectively an inlet valve IV1, IV2 and respectively an outlet valve OV1, OV3 for each of the assigned wheel brakes RB1, RB2 for performing individual brake pressure modulation. Components of the first modulation unit 16V are assigned, for performing individual brake pressure modulation, to the main system 10, 10A, 10B, 10C, 10D, so that these components of the first modulation unit 16V, and the first pressure generator 12, are actuated by the first evaluation and control unit 14 and supplied with power by the first power supply EV1. In addition, the first sub-brake system SubV in the illustrated exemplary embodiments is embodied as a hydraulically open system, and a first pressure discharge path 9V in the first sub-brake system SubV connects the outlet valves OV1, OV2 of the assigned wheels brakes RB1, RB2 of the first axle VA to the first fluid container 7V.

Figure 5:
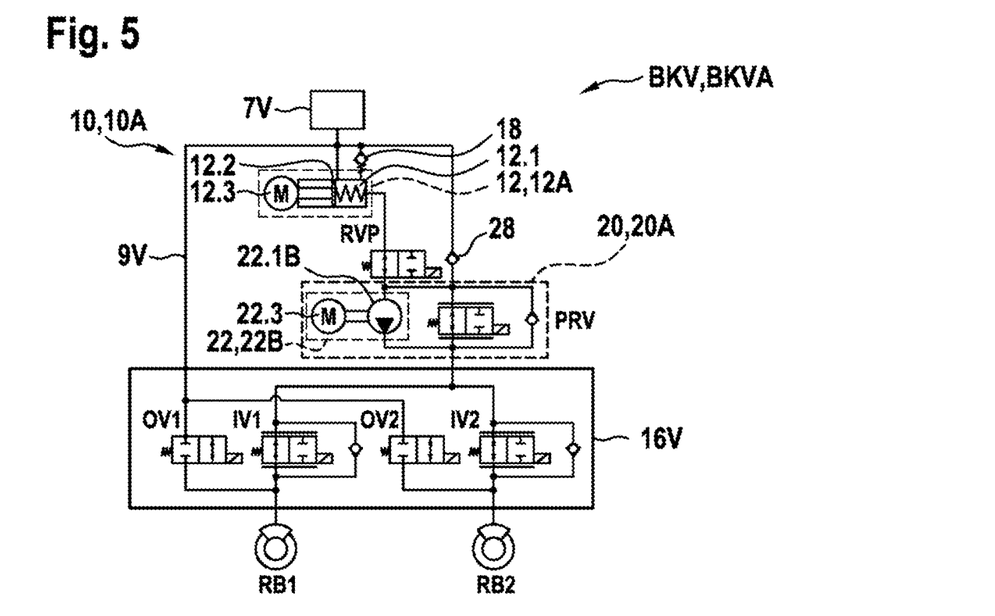
FIG. 5 shows a schematic hydraulic circuit diagram of a first exemplary embodiment of a first brake circuit of the first sub-brake system from FIG. 2.

As is also apparent from FIG. 5, in the illustrated first exemplary embodiment of the first brake circuit BKVA the first pressure generator 12 which is embodied as a plunger system 12A is arranged in the hydraulic path upstream of the second pressure generator 22 which is embodied as a pump system 22B. In addition, a shutoff valve RVP is arranged for the first plunger system 12A in the first brake circuit BKVA, which shutoff valve is assigned to the main system 10A and is actuated by the first evaluation and control unit 14 and supplied with power by the first power supply EV1. The shutoff valve RVP makes it possible to recharge brake fluid from the first fluid container 7V. In order to recharge the fluid chamber 12.1 of the first plunger system 12A, the shutoff valve RVP is opened by the first evaluation and control unit 14, so that the plunger system 12A cannot suck any fluid out of the wheel brakes RB1, RB2. In addition, the first brake circuit BKVA for the first plunger system 12A has, in addition to the direct connection to the fluid container 7V, a suction line with a nonreturn valve 18, which line additionally connects the first plunger system 12A hydraulically to the first fluid container 7V. As is also apparent from FIG. 5, the first brake circuit BKVA has, for the pump system 22B, a pressure maintenance and control valve PRV which is assigned to the secondary system 20A and, like the pump system 22B, is actuated by the second evaluation and control unit 24 and supplied with power by the second power supply EV2.

Figure 6:
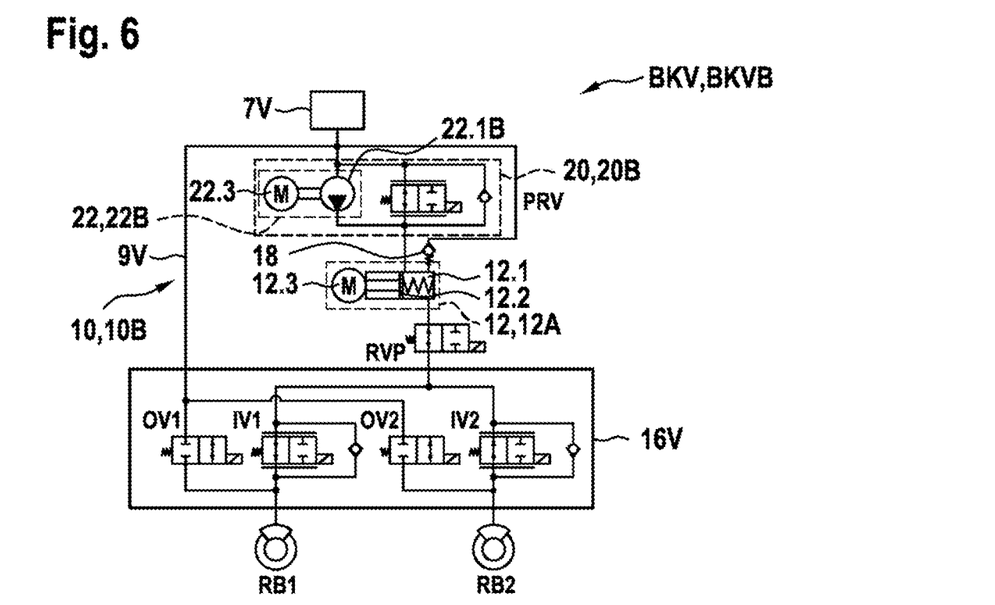
FIG. 6 shows a schematic hydraulic circuit diagram of a second exemplary embodiment of the first brake circuit of the first sub-brake system from FIG. 2.

As is also apparent from FIG. 6, the illustrated second exemplary embodiment of the first brake circuit BKVB comprises the same components as the first exemplary embodiment of the first brake circuit BKVA which is illustrated in FIG. 5. In contrast to the first exemplary embodiment, the first pressure generator 12 which is embodied as a plunger system 12A is arranged in the second exemplary embodiment in the hydraulic path downstream of the second pressure generator 22 which is embodied as a pump system 22B. Since the pump system 20B is directly connected to the first fluid container 7V, in the illustrated second exemplary embodiment it is possible to dispense with the additional suction line with a nonreturn valve 18 which additionally connects the first plunger system 12A hydraulically to the first fluid container 7V. In a way analogous to the first exemplary embodiment, for the first plunger system 12A a shutoff valve RVP, which is assigned to the main system 10B, actuated by the first evaluation and control unit 14 and supplied with power by the first power supply EV1, is arranged in the first brake circuit BKVB. The shutoff valve RVP permits brake fluid to be recharged from the first fluid container 7V. In addition, the first brake circuit BKVB has, for the first plunger system 12A, in addition to the direct connection to the first fluid container 7V, a suction line with a nonreturn valve 18 which additionally connects the first plunger system 12A hydraulically to the first fluid container 7V. As is also apparent from FIG. 6, the first brake circuit BKVB has, for the pump system 22B, a pressure maintenance and control valve PRV which is assigned to the secondary system 20B and, like the pump system 22B, is actuated by the second evaluation and control unit 24 and supplied with power by the second power supply EV2.

Figure 7:
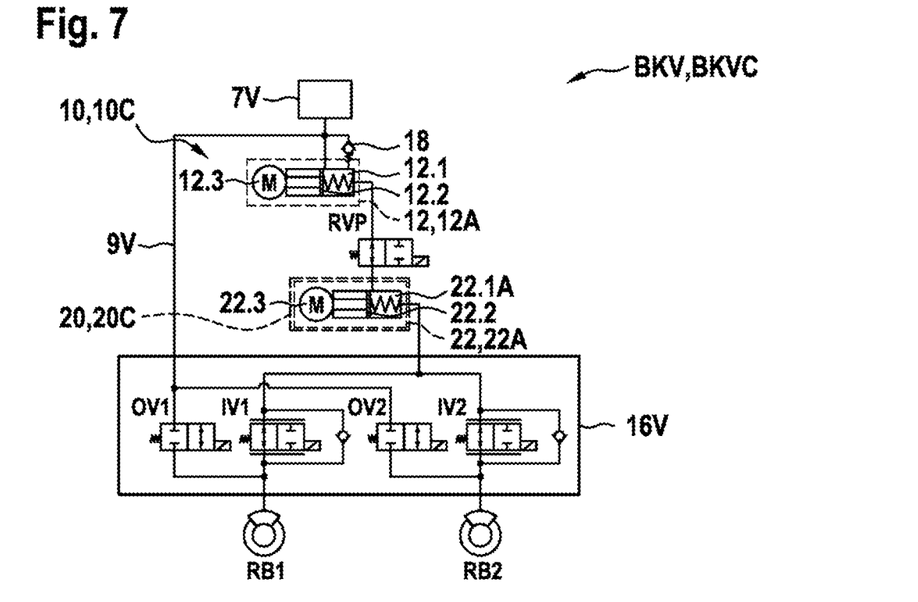
FIG. 7 shows a schematic hydraulic circuit diagram of a third exemplary embodiment of the first brake circuit of the first sub-brake system from FIG. 2.

As is also apparent from FIG. 7, in the illustrated third exemplary embodiment of the first brake circuit BKVC, the first pressure generator 12 which is embodied as a first plunger system 12A is arranged in the hydraulic path upstream of the second pressure generator 22 which is embodied as a second plunger system 22A. The second plunger system 22A is assigned to the secondary system 20C and is actuated by the second evaluation and control unit 24 and supplied with power by the second power supply EV2. In addition, for the first plunger system 12A a shutoff valve RVP, which is assigned to the main system 10C, actuated by the first evaluation and control unit 14 and supplied with power by the first power supply EV1, is arranged in the first brake circuit BKVC. The shutoff valve RVP permits brake fluid to be recharged from the first fluid container 7V. In order to recharge the fluid chamber 12.1 of the first plunger system 12A, the shutoff valve RVP is opened by the first evaluation and control unit 14 so that the plunger system 12A cannot suck any fluid out of the wheel brakes RB1, RB2.

Figure 8:
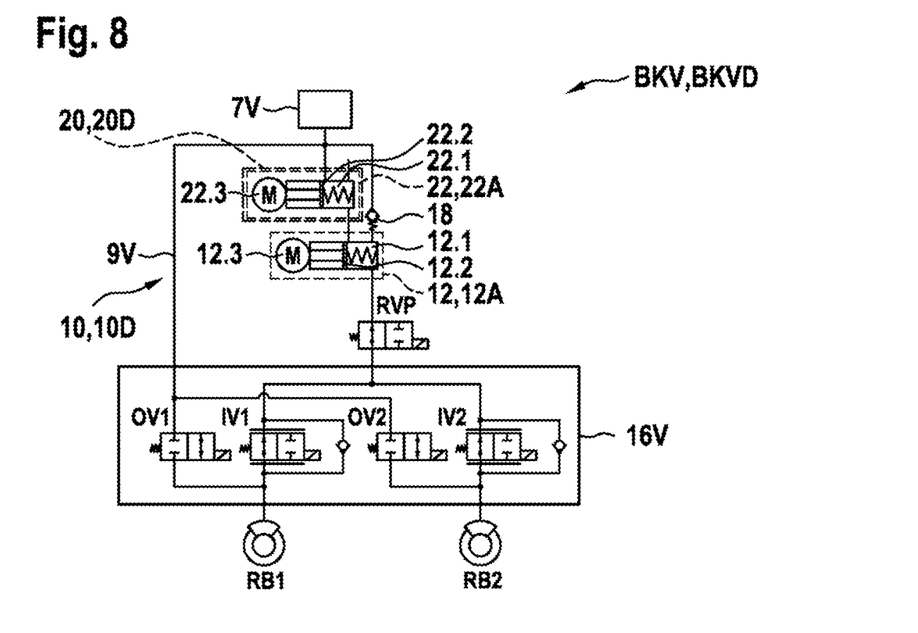
FIG. 8 shows a schematic hydraulic circuit diagram of a fourth exemplary embodiment of the first brake circuit of the first sub-brake system from FIG. 2.

As is also apparent from FIG. 8, the illustrated fourth exemplary embodiment of the first brake circuit BKVD comprises the same components as the third exemplary embodiment of the first brake circuit BKVC which is illustrated in FIG. 7. In contrast to the third exemplary embodiment, the first pressure generator 12 which is embodied as a first plunger system 12A is arranged in the second exemplary embodiment in the hydraulic path downstream of the second pressure generator 22 which is embodied as a second plunger system 22A. In a way analogous to the third exemplary embodiment, the second plunger system 22A is assigned to the secondary system 20C, actuated by the second evaluation and control unit 24 and supplied with power by the second power supply EV2. In addition, for the first plunger system 12A a shutoff valve RVP, which is assigned to the main system 10D, actuated by the first evaluation and control unit 14 and supplied with power by the first power supply EV1, is arranged in the first brake circuit BKVC. The shutoff valve RVP permits brake fluid to be recharged from the first fluid container 7V. In order to recharge the fluid chamber 12.1 of the first plunger system 12A, the shutoff valve RVP is opened by the first evaluation and control unit 14 so that the plunger system 12A cannot suck any fluid out of the wheel brakes RB1, RB2.

In alternative exemplary embodiments (not illustrated), the pressure generators 12, 22, 32 can each be embodied as a pump system with a pressure accumulator or as electrohydraulic actuators.

Embodiments of the present disclosure make available a hydraulic brake system for a vehicle having at least two axles, in particular for a highly automated or autonomous vehicle, without mechanical and/or hydraulic intervention by the driver, which brake system makes sufficient braking performance possible even in the case of a fault, by virtue of three pressure generators and a suitable redundancy concept. Of the three pressure generators, two are implemented in a redundant sub-brake system in a series connection on a first axle, preferably on a front axle. The third pressure generator is implemented in a further sub-brake system on a second axle, preferably on a rear axle. There is no hydraulic connection between the sub-brake systems on the various axles.

The invention claimed is:
1. A hydraulic brake system for a highly automated or autonomous vehicle comprising:
    a first axle with at least two wheel brakes;
    a second axle with at least two wheel brakes;
    a first sub-brake system assigned to the first axle and including
        a first brake circuit, a main system which has a first power supply, and a first evaluation and control unit, and
        a secondary system including a second power supply, which is independent of the first power supply, and a second evaluation and control unit configured to redundantly generate pressure in the first brake circuit,
    wherein the first brake circuit includes
        a first pressure generator which is assigned to the main system,
        a second pressure generator which is assigned to the secondary system and is hydraulically connected in series between a first fluid container and the at least two wheel brakes of the first axle, and
        a first modulation unit configured to hydraulically connect the first and second pressure generators to the at least two wheel brakes of the first axle, and configured to perform individual brake pressure modulation in the at least two wheel brakes of the first axle; and
    a second sub-brake system hydraulically separated from the first sub-brake system and assigned to the second axle, the second sub-brake system including
        a second brake circuit, and
        a subsidiary system which has a third power supply and a third evaluation and control unit configured to generate pressure in the second brake circuit,
        wherein the second brake circuit further comprises
            a third pressure generator which is assigned to the subsidiary system and is arranged between a second fluid container and the at least two wheel brakes of the second axle, and
            a second modulation unit configured to hydraulically connect the third pressure generator to the at least two wheel brakes of the second axle, and config- ured to perform individual brake pressure modulation in the at least two wheel brakes of the second axle.

2. The brake system as claimed in claim 1, wherein at least one of the first modulation unit and the second modulation unit respectively comprises an inlet valve and respectively comprises an outlet valve for each of the assigned wheel brakes for performing individual brake pressure modulation.

3. The brake system as claimed in claim 2, wherein:
at least one of the first sub-brake system and the second sub-brake system is embodied as a hydraulically open system; and
at least one of a first pressure discharge path in the first sub-brake system connects the outlet valves of the assigned wheel brakes of the first axle to the first fluid container, and a second pressure discharge path in the second sub-brake system connects the outlet valves of the assigned wheel brakes of the second axle to the second fluid container.

4. The brake system as claimed in claim 1, wherein in the first brake circuit firstly the first pressure generator and then the second pressure generator is arranged downstream of the first fluid container.

5. The brake system as claimed in claim 1, wherein in the first brake circuit firstly the second pressure generator and then the first pressure generator is arranged downstream of the first fluid container.

6. The brake system as claimed in claim 1, wherein the first, second, and third pressure generators are each embodied as a plunger system, a pump system, a pump system with a pressure accumulator, or electrohydraulic actuators.

7. The brake system as claimed in claim 6, wherein the first pressure generator of the main system is embodied as a first plunger system, and the second pressure generator is embodied as a second plunger system or as a pump system, and the third pressure generator of the subsidiary system is embodied as a third plunger system.

8. The brake system as claimed in claim 7, wherein:
the first brake circuit has, for the first plunger system, a shutoff valve which selectively permits recharging of brake fluid from the first fluid container; and
the second brake circuit has, for the second plunger system, a shutoff valve which selectively permits recharging of brake fluid from the second fluid container.

9. The brake system as claimed in claim 7, wherein:
the first brake circuit has, for the first plunger system, a suction line with a nonreturn valve which additionally connects the first plunger system hydraulically to the first fluid container; and
the second brake circuit has, for the second plunger system, a suction line with a nonreturn valve which additionally connects the third plunger system hydraulically to the second fluid container.

10. The brake system as claimed in claim 7, wherein the first brake circuit has, for the pump system, a pressure maintenance and control valve which is assigned to the secondary system and is actuated by the second evaluation and control unit and supplied with power by the second power supply.

11. The brake system as claimed in claim 10, wherein the first brake circuit has, for the pump system, a suction line with a nonreturn valve which additionally connects the pump system hydraulically to the first fluid container.

12. The brake system as claimed in claim 1, wherein:
the evaluation and control units of the first and second sub-brake systems communicate with one another via a bus system;
the first and second evaluation and control unit of the first sub-brake system are implemented as a master; and
the third evaluation and control unit of the second sub-brake system is implemented as a slave.

13. The brake system as claimed in claim 1, wherein components of the first modulation unit which are configured to perform individual brake pressure modulation are assigned to the main system such that these components of the first modulation hydraulic unit and the first pressure generator are actuated by the first evaluation and control unit and supplied with power by the first power supply.

14. The brake system as claimed in claim 1, wherein components of the second modulation unit which are configured to perform individual brake pressure modulation are assigned to the subsidiary system such that these components of the second modulation unit and the third pressure generator are actuated by the third evaluation and control unit and supplied with power by the third power supply.

15. The brake system as claimed in claim 1, wherein a selected one of the first power supply of the main system and the second power supply of the secondary system is used as the third power supply of the subsidiary system.

16. The brake system as claimed in claim 1, wherein the first is a front axle, and the second axle is a rear axle, of the vehicle.

* * * * *

UNITED STATES PATENT AND TRADEMARK OFFICE
CERTIFICATE OF CORRECTION

| | |
|---|---|
| PATENT NO. | : 11,685,346 B2 |
| APPLICATION NO. | : 17/255334 |
| DATED | : June 27, 2023 |
| INVENTOR(S) | : Friedrich et al. |

It is certified that error appears in the above-identified patent and that said Letters Patent is hereby corrected as shown below:

In the Claims

In Claim 13, at Column 14, Line 31: "the first modulation hydraulic unit" should read --the first modulation unit--.

Signed and Sealed this
Twelfth Day of September, 2023

Katherine Kelly Vidal
Director of the United States Patent and Trademark Office